H. A. CHRISTY.
METALLIC CAB ROOF.
APPLICATION FILED JULY 3, 1912.
1,068,317.
Patented July 22, 1913.
8 SHEETS—SHEET 1.
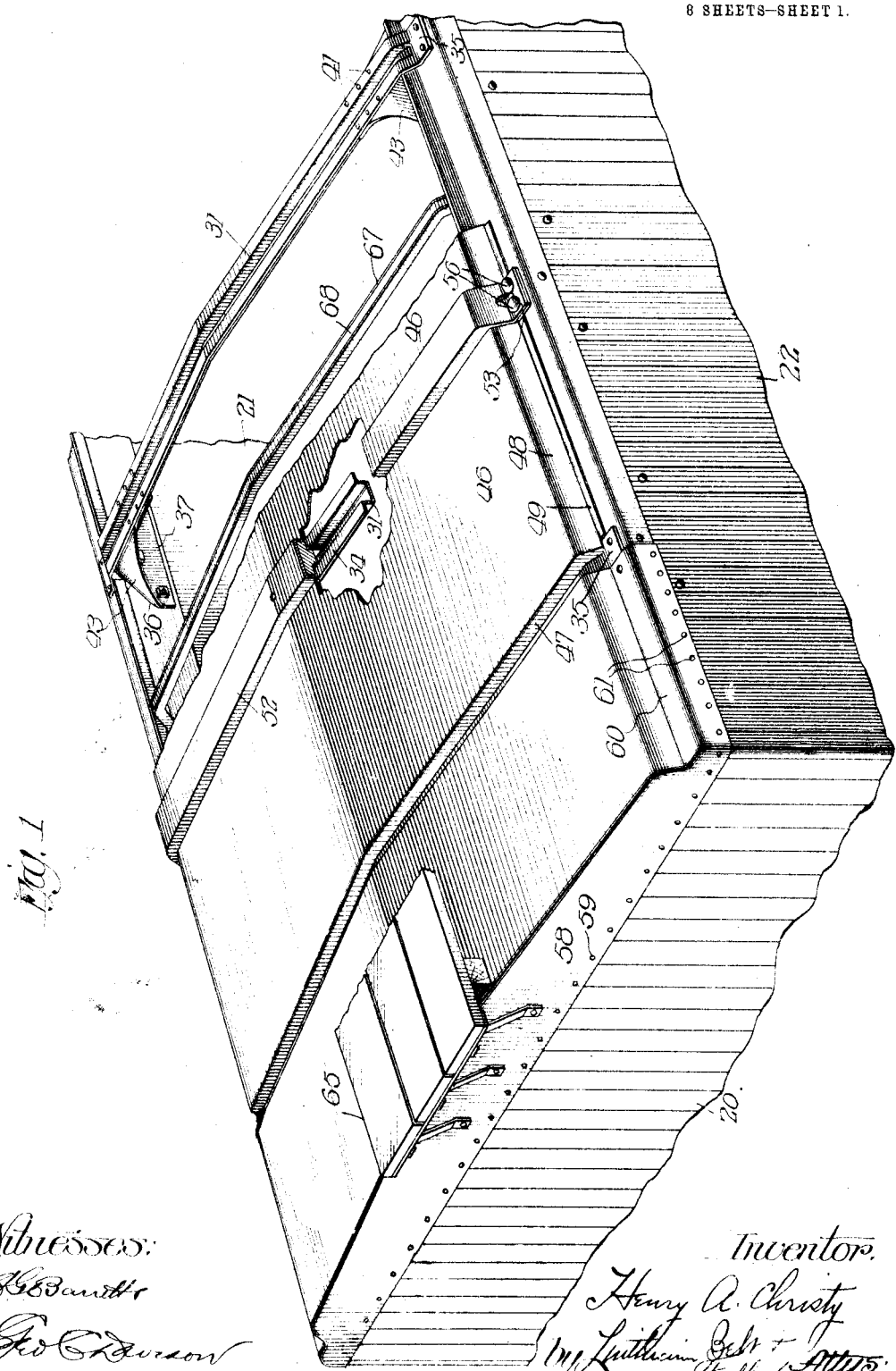

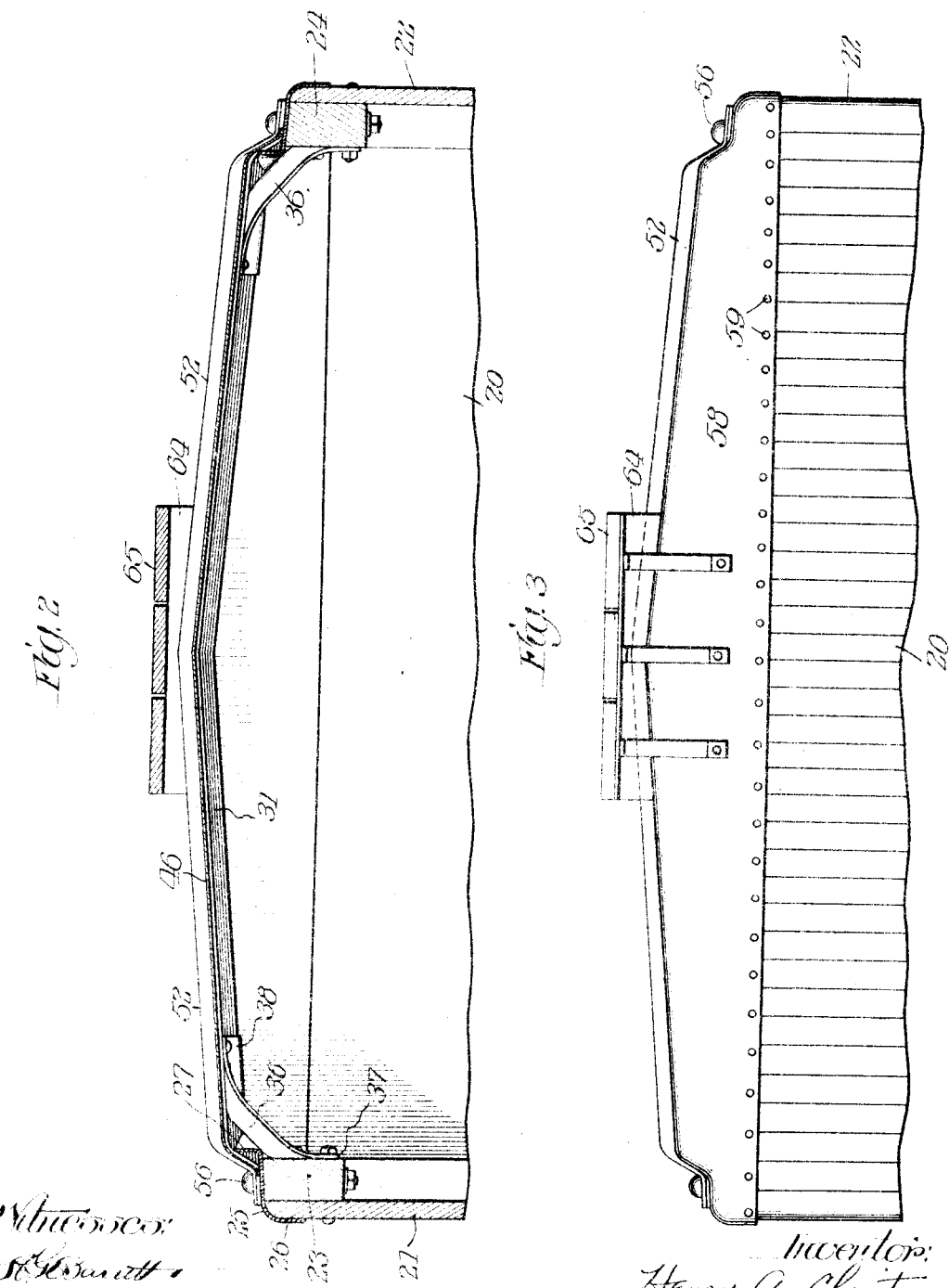

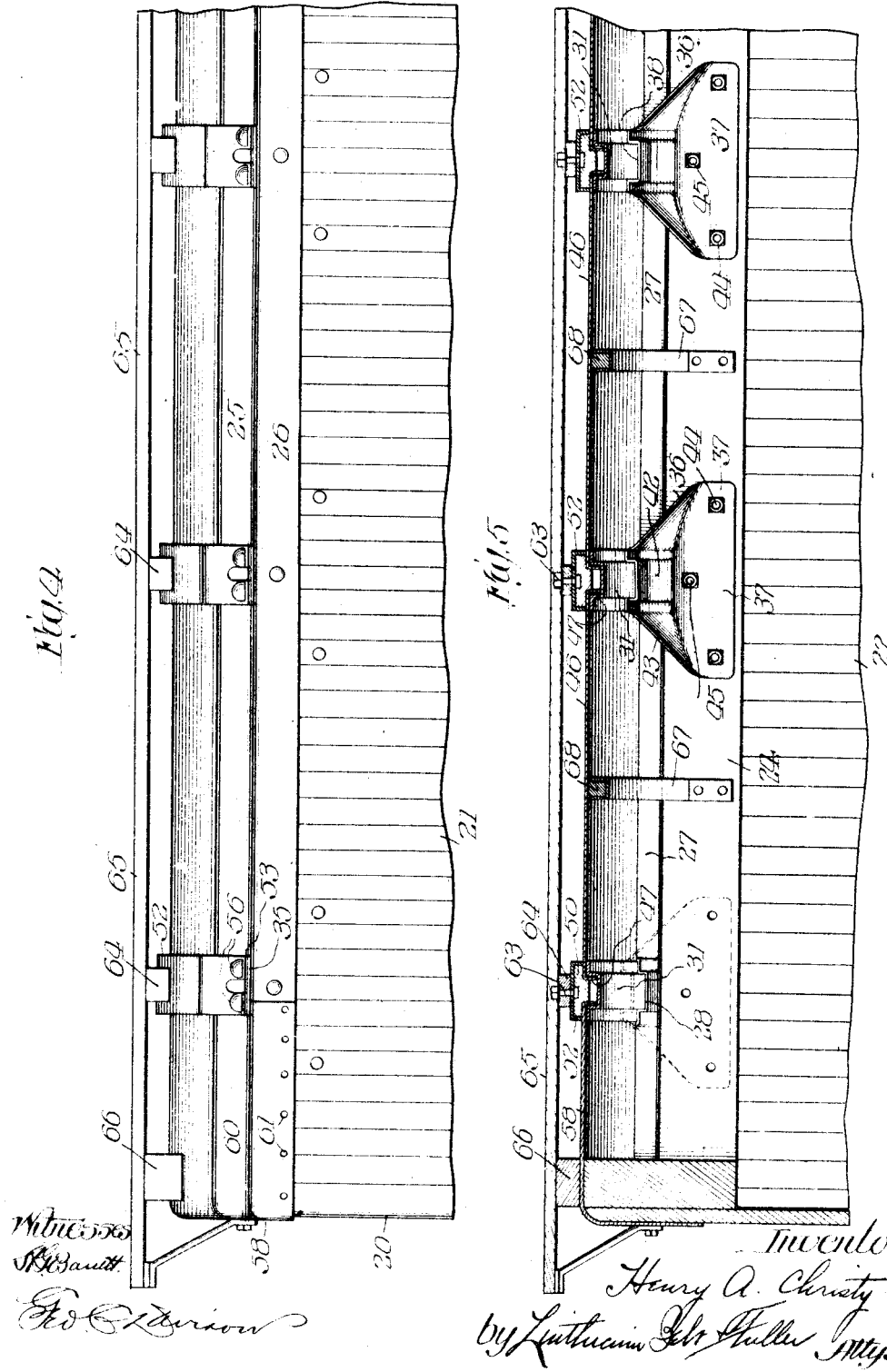

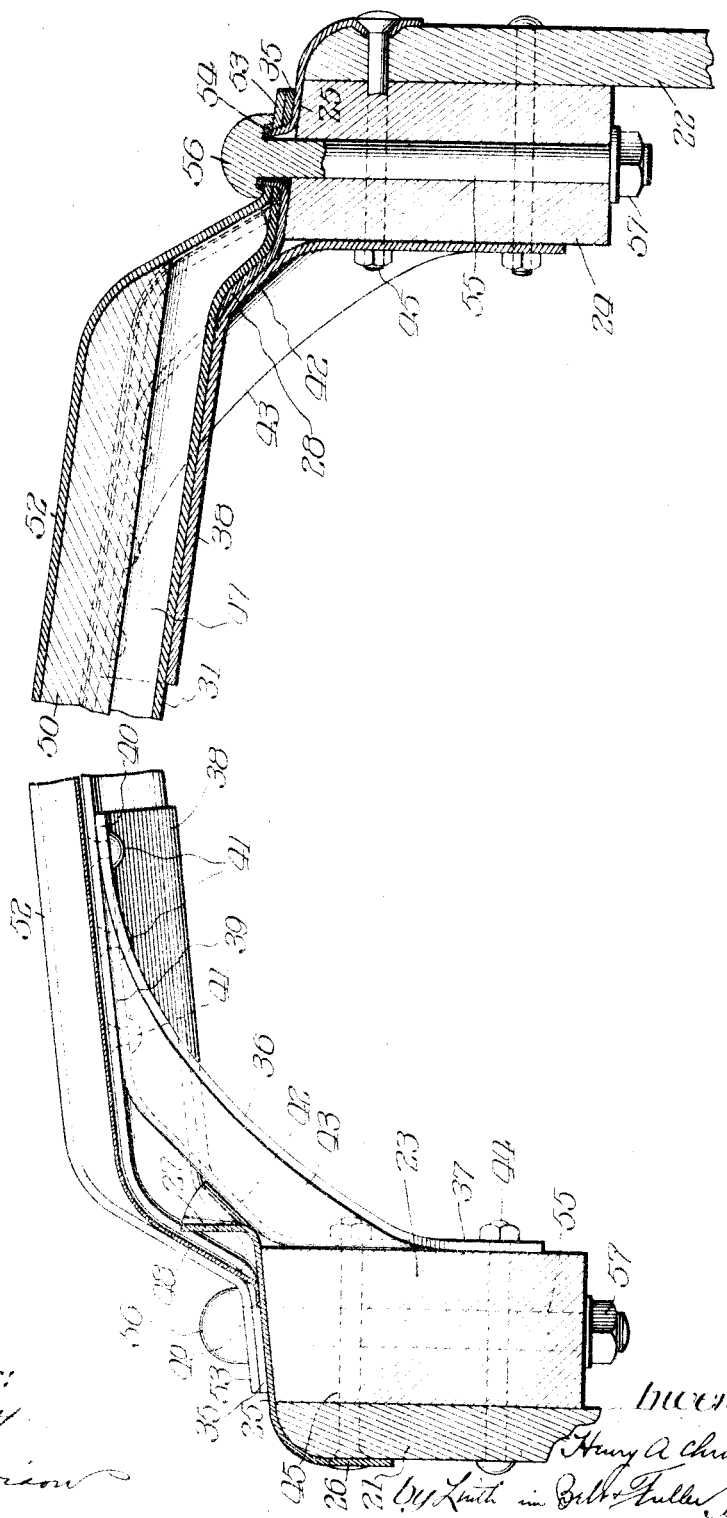

H. A. CHRISTY.
METALLIC CAR ROOF.
APPLICATION FILED JULY 3, 1912.
1,068,317.
Patented July 22, 1913.
8 SHEETS—SHEET 5.
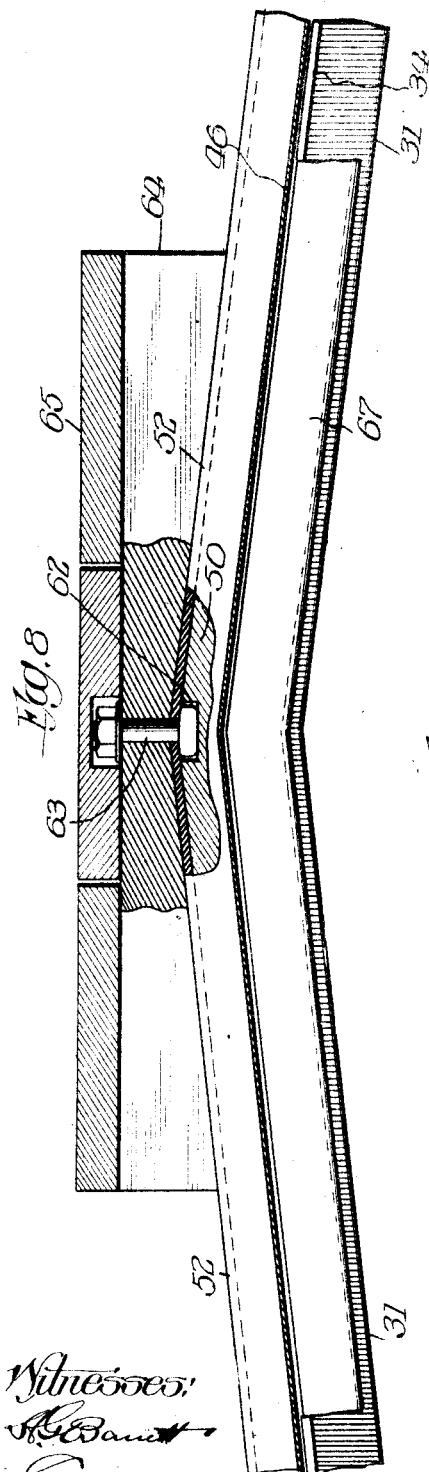
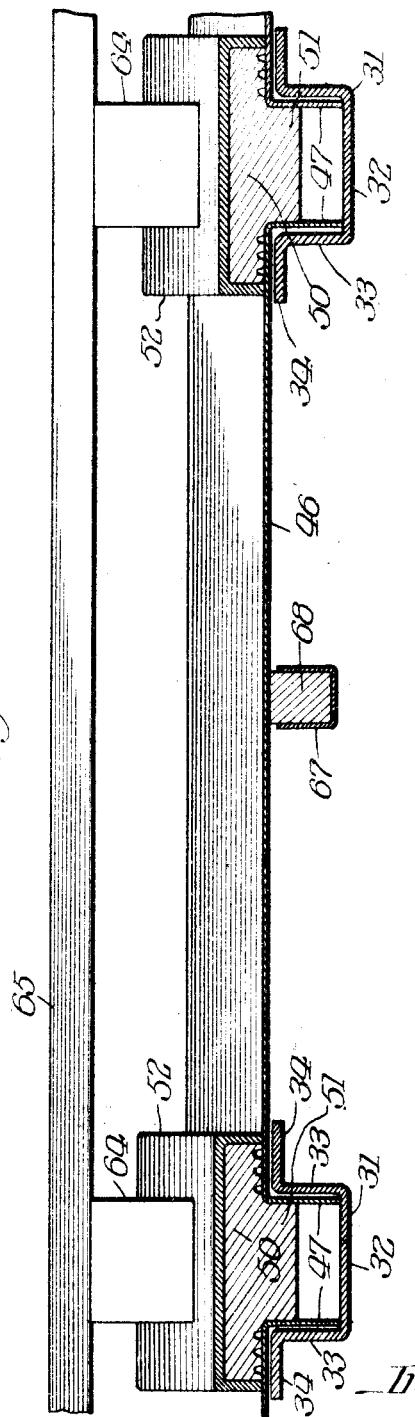

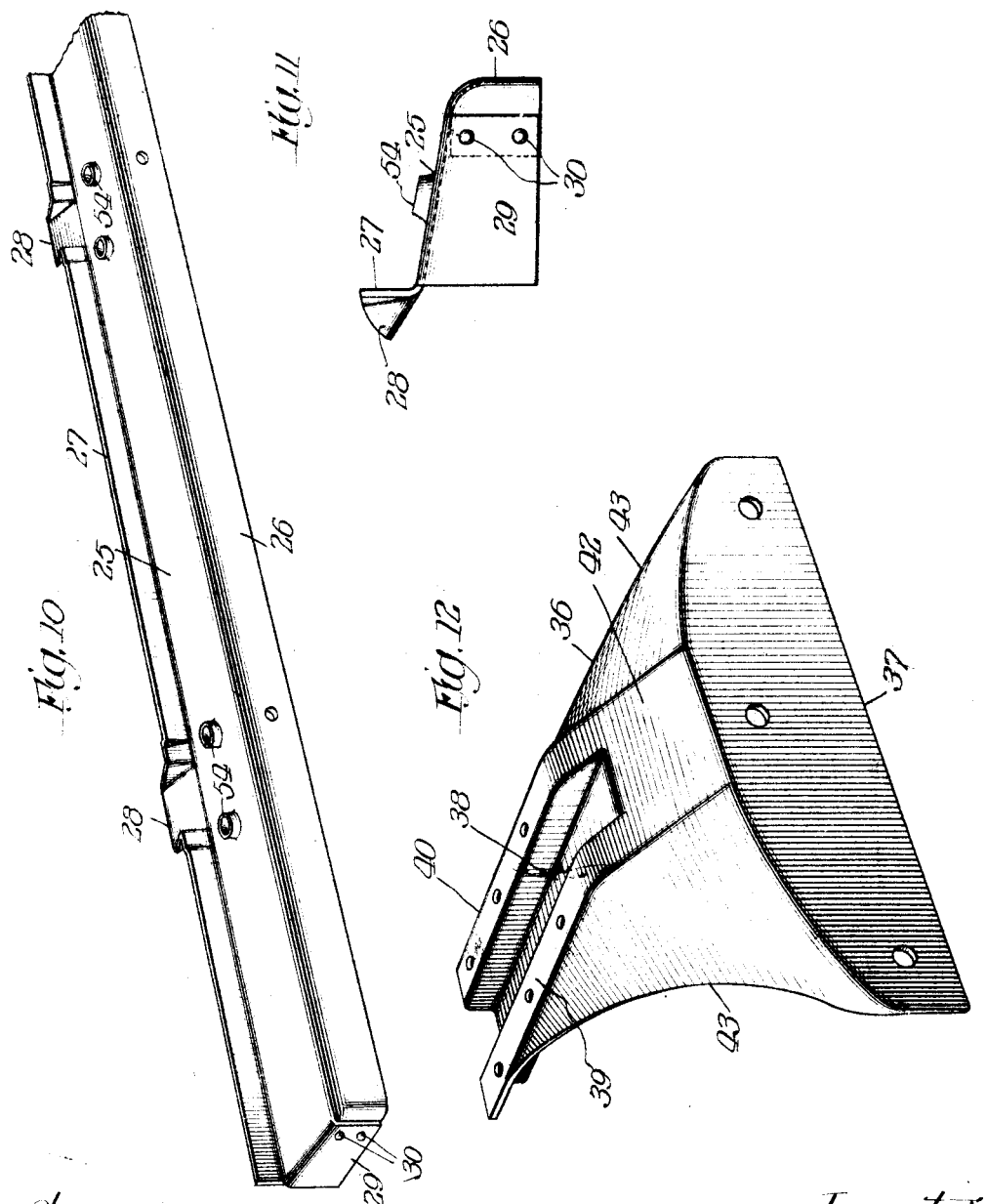

H. A. CHRISTY.
METALLIC CAR ROOF.
APPLICATION FILED JULY 3, 1912.
1,068,317.
Patented July 22, 1913.
8 SHEETS—SHEET 7.
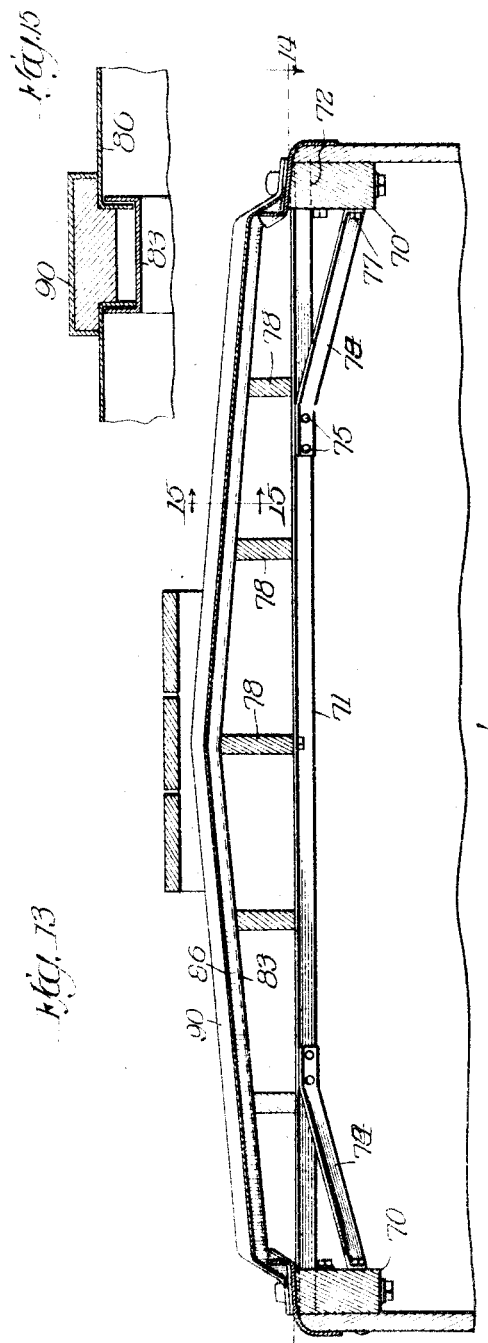
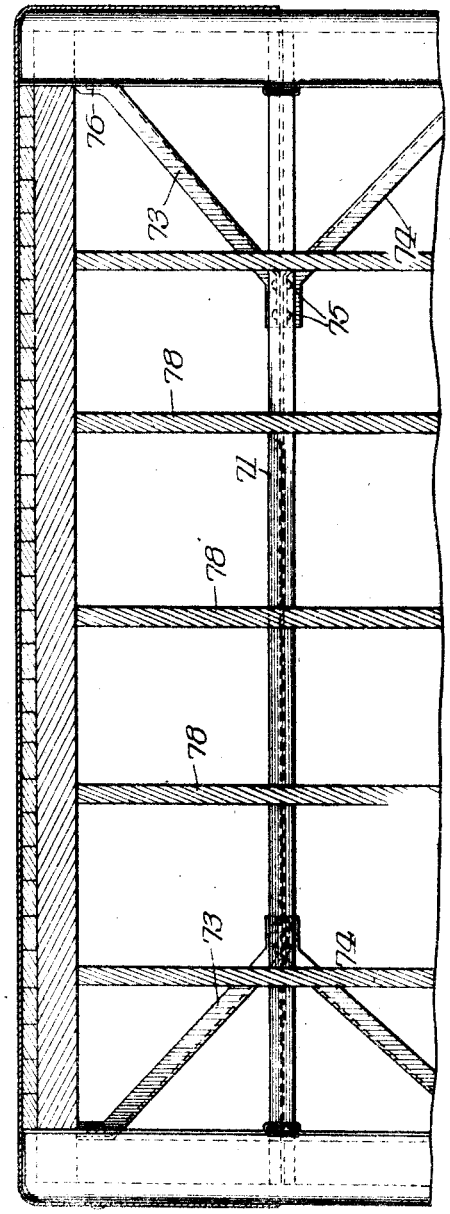

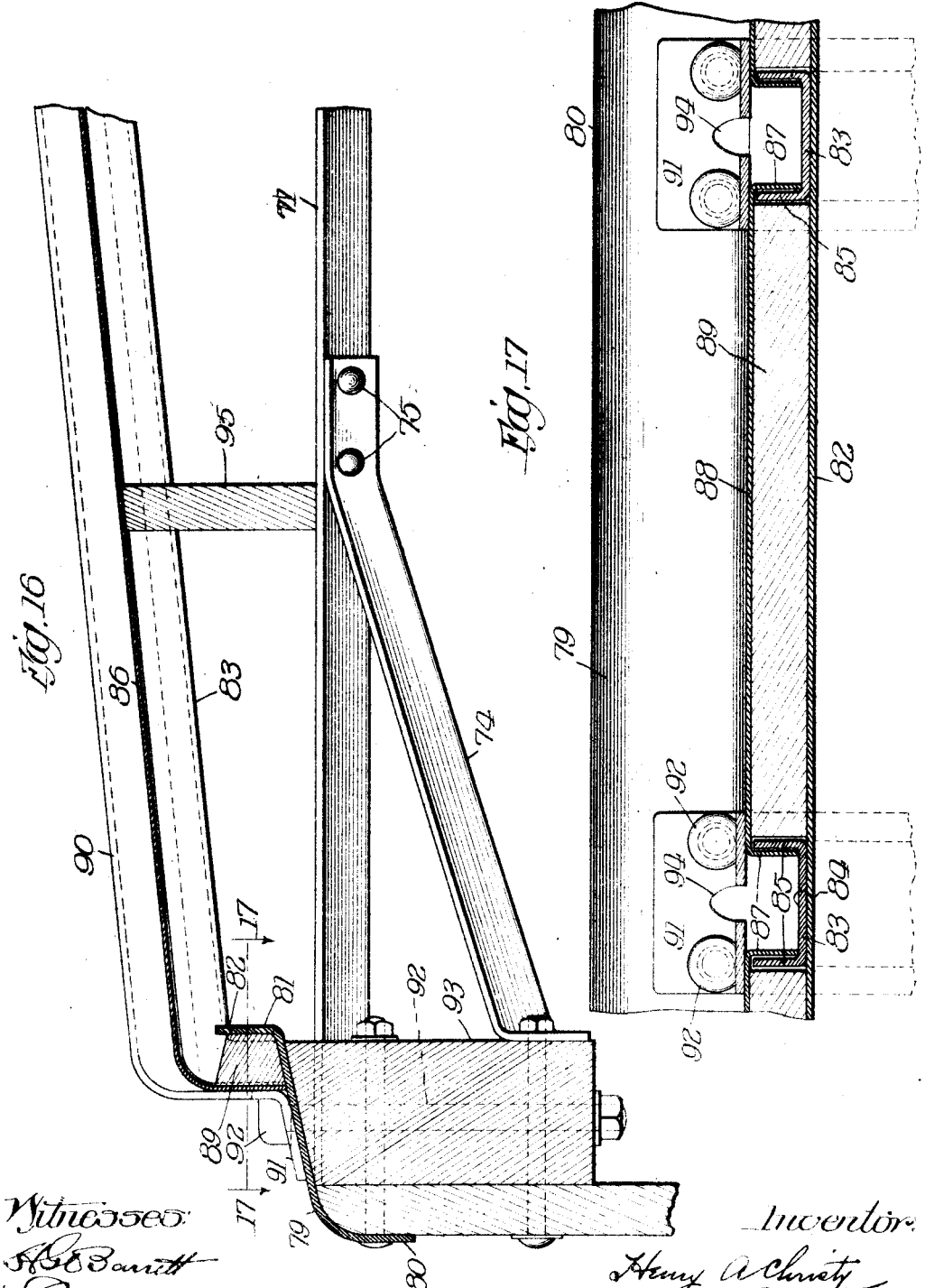

UNITED STATES PATENT OFFICE.

HENRY A. CHRISTY, OF KENILWORTH, ILLINOIS.

METALLIC CAR-ROOF.

1,068,317.  Specification of Letters Patent.  Patented July 22, 1913.

Application filed July 3, 1912. Serial No. 707,415.

*To all whom it may concern:*

Be it known that I, HENRY A. CHRISTY, a citizen of the United States, residing at Kenilworth, in the county of Cook and State of Illinois, have invented certain new and useful Improvements in Metallic Car-Roofs, of which the following is a specification.

My present invention relates more especially, but not exclusively, to the mechanical constructions of the roofs of railway cars.

For some time, various types of metal roof-structures have been devised, but in several ways these structures have failed to fulfil all of the various requirements to the best advantage, and it is, therefore, one of the objects of the present invention to supply a roof-structure which shall be simple in construction, economical to manufacture, easy to repair, and less subject to damage than has heretofore been usual.

With these objects in view I have devised as embodiments of this invention the structures illustrated in the accompanying drawings forming a part of this specification, and to which reference should be made for a full and complete comprehension of the features of structure involved.

In these drawings: Figure 1 is a fragmentary perspective view of one embodiment of my improved roof; Fig. 2 is a cross-section through the same; Fig. 3 is an end elevation of the roof-structure; Fig. 4 is a fragmentary side elevation: Fig. 5 is a central longitudinal section; Fig. 6 is a fragmentary cross-section on an enlarged scale; Fig. 7 is a similar section through a different plane; Fig. 8 is a cross-section through the central portion of the roof; Fig. 9 is a longitudinal section at one side of the central plane of the car; Fig. 10 is a fragmentary perspective view of one of the eave-strips; Fig. 11 is an end view of the eave-strip shown in Fig. 10; Fig. 12 is a perspective view of one of the braces; Fig. 13 illustrates in cross-section a modified form of roof structure embodying this invention; Fig. 14 is a fragmentary horizontal section on line 14—14 of Fig. 13; Fig. 15 is a detail section through one of the carlines, the roof-plates and cap-strip; Fig. 16 is an enlarged cross-section of a still further modification, and Fig. 17 is a horizontal section on line 17—17 of Fig. 16.

By reference to the drawings and more particularly to Figs. 1 to 12 inclusive, it will be apparent that the car structure, as is usual, has a car-body end-wall 20 and side-walls 21 and 22 at the tops of which are disposed the horizontal side-plates 23 and 24. Along the tops of these side-plates 23 and 24 and the top edges of the side-walls or sheathing 21 and 22 are disposed longitudinal metal eave-strips 25, each having at its outer edge a depending flange 26 overlapping the top portion of the car-body side-wall, all as is clearly illustrated in Fig. 2. At its inner edge, each of these eave-strips has an upstanding flange 27 bent at intervals at 28, as shown in Fig. 10 for the accommodation of the carlines and roof-plates described hereinafter. At each end, each of these eave-strips has a downturned flange 29 fastened at 30 to an inturned end of the flange 26 to form a neat and substantial corner.

Suitably spaced apart, and accommodated at their ends in the depressions 28, are channel carlines 31 each having, as is shown in Fig. 9, a web 32, a pair of upstanding stiffening walls 33 forming the trough of the carline, each of such walls at its upper edge having outstanding bracing flanges 34. These carlines, as is clearly shown in the drawings, are of the cambered or bent formation so as to provide a roof of double slope with suitable and sufficient inclination for drainage purposes. At each end, each of these carlines terminates in a flat ear 35 adapted to rest on the tops of the eave-strips 25. Inasmuch as this structure does not have a ridge-pole, and in order to additionally stiffen and strengthen the framework, each carline at each end is connected to the car-body side-wall by a shaped sheet-metal bracket or brace 36 of the conformation as shown in Fig. 12. Such bracket has an apertured flat plate-portion 37, adapted, as is shown in Fig. 6, to lie against the inner face of the corresponding side-plate 23 or 24. On its top this bracket 36 has a channel-portion 38 adapted to fit about and accommodate the end-portion of the carline, the two apertured portions 39 and 40 lying directly beneath the oppositely-disposed flanges 34, 34 of the carlines to which they are fastened by suitable rivets 41, 41. As is shown, each of these brackets is, when in place, of general inclined disposition, the surface 42 being disposed directly beneath the inclined wall of the depression 28 of the eave-strip. The two substantially horizontal flanges 39 and 40 of the bracket are, as is illustrated, connected to the plate 37 by flaring wings or gussets 43, 43 for obvious stiffening and bracing purposes.

By means of bolts 44 passing through the side-plate and the car-body side-wall, the bracket-plate 37 is fastened against the inner face of the side-plate, and by means of another bolt 45 extending through alined apertures in the flange 26 of the eave-strip, the car-body side-wall, the side-plate, and the bracket or brace is additionally secured in position. Each of these brackets not only assists in supporting the carline in position, but as will be clear, it also braces it and stiffens it against lateral displacement, so that the whole car-roof framing, even though it has no ridge-pole and is composed substantially of carlines extending from side-wall to side-wall suitably braced, presents a firm, rigid and secure structure for holding in position the roof-plates and other appurtenances of the roof-construction.

Each of the sheet-metal roof-plates 46, 46 extends from side-wall to side-wall and is bent across its middle to give it the proper camber or shape to conform to that of the carlines. Along its longitudinal edges each of these plates has a depending flange 47 accommodated in the troughs of the carlines, the lower edges of such flanges resting upon the webs of the carlines, the flanges being of sufficient width to support the roof-plates above the edges of the flanges 34 of the carlines, so that whatever wear takes place does not occur between the roof-plates and the carline flanges. Furthermore, these roof-plate flanges 46 are spaced away from the corresponding walls 33 of the carlines whereby to give the roof a certain and adequate degree of yield or flexibility so that it may accommodate itself to uneven loading of the car-body and uneven settling or deflection of the car-body walls without tearing or otherwise injuring any of the plates. Each of these roof-plates at its outer ends is bent down to form a sloping flange or wall 48 terminating in a narrow flat-portion 49 resting directly on the body-section or web-portion of the eave-strip.

The advantage of the association of the roof-plates, troughed carlines and cap-strips, substantially as described, in shedding water is obvious, and it should be apparent that any water which might find its way under the capstrips from a driving rain-storm or from snow or ice being frozen on the roof and acting as a dam will be promptly carried off by the channel or trough of the carlines.

Above each carline and partially housed within the same between the flanges of the roof-plates, I employ wooden fillers or strips 50 having central depending portions 51 fitting in holes between such roof-plate flanges. The tops and sides of these wooden strips are covered with bent metal caps 52 of inverted channel shape, such cap-strips, as shown in Fig. 1, extending from side-wall to side-wall and terminating in flat ears 53 disposed above the attachment-ears 35 of the carlines, and in order to fasten these cap-strips, carlines, and eave-strips in proper position, to the tops of the car-body side-walls, I provide each eave-strip at intervals with apertures surrounded by marginal upstanding rims or flanges 54, which extend upwardly through registering holes in the ears 35 and 53 of the carlines and cap-strips respectively. Extended through each of these carlines, and also through an alined hole 55 of the side-plate, is a bolt having a mushroom head between which, and the upper edge of the rib 54 is interposed a soft copper washer forming a water and moisture-tight connection between the parts. The nuts 57 for such bolts are on the inside of the car and bear against the bottoms of the side-plates so that these series of bolts hold the parts of the roof in place in such a manner that they may be detached and removed with facility and despatch, and yet at the same time, these holding and securing means do not project outwardly beyond the side of the car-body, where they would be subject to side-wiping.

As is clearly indicated in Fig. 1, each of the sheet-metal roof-plates at the end of the car-body has on one side a flange received in the trough of the next adjacent carline, as do the other roof-plates, but at its opposite edge at the end of the car-body, it is supplied with a flange 58 overlapping the end-wall of the car and fastened thereto by any suitable means such as bolts or screws 59. At its ends, each of these end roof-plates is equipped with an integral stepped flange 60 conforming to the shape of the eave-strip and fastened to the car-body side-wall at 61, all as is clearly illustrated.

A further feature of novelty and improvement in this embodiment of the invention resides in the manner of supporting the running-boards, which, in this particular instance, are fastened to and supported by the channel metal coverings forming parts of the cap-strips over the carlines. At the center of the roof, each of the wooden-fillers 50 is recessed as shown in Fig. 8 at 62 for the reception of the head of a bolt 63 adapted to detachably fasten to the metal cap-strip 52 a supporting-block 64, preferably of wood, and shaped on its under surface to conform to the double inclination of the roof so that the lower edge of such support rests directly on the oppositely inclined portions of the metal cap-strip 52. To the top edges of these various supports 64, I fasten the running-board planks 65 which may be made in sections, if desired, and are preferably made readily detachable.

As is shown in Fig. 4, at each end of the car I employ an additional wooden block or support 66, to which the running-boards may be fastened. Desirably, though not necessarily, these channel cap-strips 52 are made sufficiently strong so as to stand the entire weight imposed on the running-boards, and this I consider to be a feature of marked novelty and utility because by this construction, there are no bolt, rivet, or other holes through the middle portion of the roof-structure. In other words, the carlines, roof-plates, and cap-strips all extend from side-wall to side-wall uninterruptedly, except for the holes in the cap-strips for the accommodation of the bolt 63, but it should be noticed, however, that these holes do not extend through the roof proper because the trough-shaped carlines are directly beneath these cap-strips.

Between the carlines I may employ, if found desirable, or necessary, intermediate roof-supports of channel form, such parts being characterized 67 in the drawing, the troughs of these transoms or cross-supports being preferably equipped with wooden fillers 68 on which the roof-plates rest, so that there is no metal to metal contact as in the case of the carlines. These intermediate or supplemental roof-supports 67 also extend from side-wall to side-wall.

If any of the roof-plates become damaged sufficiently to require its removal or replacement, this can be readily accomplished by taking off the running-boards either wholly or in part, removing the two adjacent cap-strips and lifting out the injured roof-plate section after the same has been released by removal of the proper cap-strips. It should, therefore, be obvious that to repair the car-roof of this kind is a matter of but slight trouble and expense. Damage to these plates, however, is minimized because they do not project over the side-walls and are, therefore, less subject to injury due to side wiping of cars. This feature of construction of the roof, whereby the roof-plates and cap-strips are kept well within the outer planes of the sides of the car I believe to be also a feature of marked novelty and utility.

In Figs. 13, 14, and 15 I have illustrated a somewhat modified construction, and in this instance the roof-structure proper may be substantially the same as that illustrated in Figs. 1 to 12 inclusive with the exception, however, that possibly the troughed metal carlines may be of somewhat lighter construction owing to the additional support which is given to the roof by the means hereinafter described. In this particular construction the side-plates 70 of the car are cross-connected at intervals by means of bars 71, which in the present instance are of T formation, the ends of the bars or beams being accommodated in recesses 72 in the side-plates, and bolted or otherwise fastened therein as may be preferred. In order to brace these bars in position, I employ at each end of each of the same a pair of diverging brace bars or brackets 73 and 74 of angle cross-section, and having ends shaped for riveting at 75 to the webs of the cross-bar and at 76 and 77 for bolting or otherwise securing to the car-body side-plates. In this way I employ these cross-bars and braces in substitution of the pressed metal braces and brackets of the construction shown in Figs. 1 to 12 inclusive, and in order to give the roof additional support I place on top of the cross-bars 71 any desired number of longitudinal roof-supporting strips 78, which act as purlines to assist in supporting the carlines and roof-plates in position. In other respects, this construction is substantially the same as that shown in the form already described.

In Figs. 16 and 17 I have illustrated a still further modification, which has the cross-bars and braces of the construction shown in Figs. 13 to 15 inclusive, and which has certain features in common with the roof-structure illustrated in Figs. 1 to 12 inclusive. In this case, however, the longitudinal eave-strips 79 each have a downturned flange 80 at its outer edge and an upturned flange 81 at its inner edge notched at 82 at intervals for the accommodation of the end-portions of the carlines 83, which are of channel form and at their ends are bent over so as to provide channel depending ears composed of webs 84 and flanges 85. The roof-plates 86 are similar to the others, but have their ends as well as their longitudinal flanges bent down with their flanges 87 accommodated in the downturned portions of the carlines 83, all as is clearly illustrated in Fig. 17. Between the carlines and between the vertical flanges 82 of the eave-strips and the inner marginal flanges 88 of the roof-plates, I interpose wooden or other suitable fillers 89 shown in both Figs. 16 and 17. Above these carlines I employ the usual cap-strips 90 with their fillers, each of such cap-strips at each end having an apertured terminal ear 91 secured by means of a pair of bolts 92 above the side-plate 93 against the top face of the body of the eave-strip 79, one side of the head of the bolt being cut away if desired. In order that any moisture which may for any reason reach the trough of the carline may be readily discharged at the side of the car, each terminal portion of the cap-strip is recessed at 94 to secure the proper drainage so that any water issuing from such exit may be discharged over the eave-strip and from the side of the car. This aperture or discharge opening 94 is more in the nature of a safety appliance than of a necessity, because under ordinary condition there is no drainage required for the troughs of the carlines. As in the instance illustrated in Figs. 13 to 15 inclusive, the carlines and roof-plates may be additionally supported by the longitudinal supports 95, any desired number of which may be used.

While I have herein illustrated several embodiments of the invention under consideration, it is not to be understood that the invention is limited to the precise and exact details of construction, because these may be varied within comparatively wide limits without departure from the heart of the invention and without sacrificing any of its substantial benefits and advantages.

I claim:

1. In a railway-car, the combination of car-body side-walls, metal eave-strips covering the tops of said side-walls, carlines extending from side-wall to side-wall, roof-plates associated with said carlines, and cap-strips over said carlines, said cap-strips being secured to the car-structure above said eave-strips, substantially as described.

2. In a railway-car, the combination of car-body side-walls, metal eave-strips covering the tops of said side walls, carlines extending from side-wall to side-wall, roof-plates associated with said carlines, and cap-strips over said carlines, said roof-plates and cap-strips terminating above said side-walls, substantially as described.

3. In a railway-car, the combination of car-body side-walls, metal eave-strips covering the tops of said side-walls, channel-carlines disposed trough-side upward extending from side-wall to side-wall, roof-plates having downturned flanges accommodated in the troughs of said carlines, cap-strips over said carlines, said roof-plates and cap-strips terminating above said side-walls, and means to fasten said cap-strips to the tops of said side-walls, said means also fastening said roof-plates in position, whereby removal of the cap-strips permits lifting of the roof-plates out of place, substantially as described.

4. In a railway-car, the combination of car-body side-walls, channel carlines extending from side-wall to side-wall and free from perforations in their troughs, flanged roof-plates extending from side-wall to side-wall and free from perforations in their central portions, the flanges of said roof-plates being accommodated in the troughs of said carlines, and means associated with said carlines and car-body side-walls to brace the ends of the carlines thereby avoiding the necessity of employing a ridge-pole, substantially as described.

5. In a railway-car, the combination of car-body side-walls, channel carlines extending from side-wall to side-wall and free from perforations in their troughs, flanged roof-plates extending from side-wall to side-wall and free from perforations in their central portions, the flanges of said roof-plates being accommodated in the troughs of said carlines, and metal eave strips above said side-walls having on their inner edges upwardly-extended flanges depressed at intervals to receive and brace said carlines, substantially as described.

6. In a railway-car, the combination of car-body side-walls, channel carlines extending from side-wall to side-wall and free from perforations in their troughs, roof-plates extending from side-wall to side-wall and having downturned flanges accommodated in the troughs of said carlines, said roof-plates being free from perforations in their central portions, metal eave-strips above said side-walls having on their inner edges upwardly-extended flanges provided with depressions at intervals for the accommodation of said carlines, and braces fastened to said side-walls and provided with depressions to receive and brace said carlines, substantially as described.

7. In a railway-car, the combination of car-body side-walls, channel carlines extending from side-wall to side-wall and free from perforations in their troughs, metal roof-plates extending from side-wall to side-wall and having downturned flanges accommodated in the troughs of said carlines, said roof-plates being free from perforations in their central portions, metal eave-strips above said side-walls having on their inner edges upwardly-extended flanges provided at intervals with depressions for the accommodation of said carlines, and braces fastened to said side-walls supporting the flanges of said eave-strips and also shaped with depressions to receive and brace said carlines, substantially as described.

8. In a railway car, the combination of a car body having side-walls, a sheet metal roof of less width than the car body provided at each side of the car with an integral downwardly-offset portion terminating short of the outside surface of the body of the car side, and fastening means for said offset portion located entirely at the inner side of the outer face of the car side, substantially as described.

In testimony whereof I have executed this application this 28th day of June, 1912, in presence of the following witnesses.

HENRY A. CHRISTY.

Witnesses:
 WALTER M. FULLER,
 ALVAREZ A. BARNES.